United States Patent
Tomita et al.

(10) Patent No.: US 7,380,416 B2
(45) Date of Patent: Jun. 3, 2008

(54) CONDUIT FOR MOLTEN GLASS, CONNECTING CONDUIT FOR MOLTEN GLASS AND VACUUM DEGASSING APPARATUS

(75) Inventors: Naruaki Tomita, Yokohama (JP); Yasuharu Hirahara, Yokohama (JP); Kazuo Hamashima, Yokohama (JP); Koji Obayashi, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 254 days.

(21) Appl. No.: 11/196,283

(22) Filed: Aug. 4, 2005

(65) Prior Publication Data

US 2005/0268663 A1 Dec. 8, 2005

Related U.S. Application Data

(63) Continuation of application No. PCT/JP2004/001034, filed on Feb. 3, 2004.

(30) Foreign Application Priority Data

Feb. 4, 2003 (JP) ............................. 2003-027171

(51) Int. Cl.
*C03B 5/225* (2006.01)

(52) U.S. Cl. ................. 65/134.2; 65/134.9; 65/374.12; 65/347; 96/176; 96/193

(58) Field of Classification Search ............... 65/134.1, 65/134.2, 134.9, 374.11, 374.12, 346, 347; 75/508, 512; 96/176, 193, 197, 198, 201; 95/242, 260, 262, 266

See application file for complete search history.

(56) References Cited

U.S. PATENT DOCUMENTS

| 1,811,678 | A | * | 6/1931 | Smith .......................... 228/151 |
| 2,017,058 | A | * | 10/1935 | Freeze .......................... 138/100 |
| RE36,082 | E | * | 2/1999 | Ishimura et al. ............. 65/32.5 |
| 6,286,337 | B1 | * | 9/2001 | Palmquist ..................... 65/157 |
| 7,007,514 | B2 | * | 3/2006 | Sakai et al. ................... 65/157 |
| 2002/0046586 | A1 | | 4/2002 | Singer |

FOREIGN PATENT DOCUMENTS

| JP | 8-67518 | 3/1996 |
| JP | 9/1142851 | 6/1997 |
| JP | P2000-302457 A | 10/2000 |
| JP | 2002-12926 | 1/2002 |
| JP | 2002-87826 | 3/2002 |

* cited by examiner

*Primary Examiner*—Eric Hug
(74) *Attorney, Agent, or Firm*—Oblon, Spivak, McClelland, Maier & Neustadt, P.C.

(57) ABSTRACT

The present invention provides a A metal conduit for molten glass and a vacuum degassing apparatus are disclosed, which are capable of coping with extension and contraction, and vibration. By disposing at least one convex portion 20 so to have a height of 4 mm or above in a radial direction and continuously extend in a peripheral direction, it is possible to absorb thermal expansion and contraction without changing the entire length of the metal conduit 10 and to suppress from the metal conduit 10 from vibrated even when molten glass 121 is conveyed by the metal conduit. By employing the metal conduit 10 stated earlier in an upstream conveying pipe 130A, an uprising pipe 122U, a vacuum degassing vessel 120, a downfalling pipe 122L, a downstream conveying pipe 130B or the like in a vacuum degassing apparatus 30, it is possible to cope with thermal expansion and contraction, and vibration caused when conveying molten glass 121.

13 Claims, 8 Drawing Sheets

(A)

(a)

(b)

(B)

CONDUIT FOR MOLTEN GLASS, CONNECTING CONDUIT FOR MOLTEN GLASS AND VACUUM DEGASSING APPARATUS

TECHNICAL FIELD

The present invention relates to a conduit for molten glass, a connecting conduit for molten glass and a vacuum degassing apparatus.

BACKGROUND ART

As a conventional vacuum degassing apparatus in a production line for glass products, the one shown in FIG. 12 has been disclosed (see, e.g., JP-A-9-142851). Specifically, this vacuum degassing apparatus 100 includes an upstream conveying pipe 130A for supplying molten glass 121, an uprising pipe 122U disposed at a downstream end portion of the upstream conveying pipe 130A for drawing up the molten glass 121 in a vertically upward direction, a vacuum degassing vessel 120 disposed to extend horizontally from an upper end of the uprising pipe 122U, a downfalling pipe 122L for guiding the molten glass 121 from a downstream end portion of the vacuum degassing vessel 120 in a vertically downward direction, a downstream conveying pipe 130B for guiding the molten glass 121 in a further downstream side from the downfalling pipe 122L, and the like.

The uprising pipe 122U, the vacuum degassing vessel 120 and the downfalling pipe 122L are covered by a casing 123, being externally insulated by a thermal insulating material. The uprising pipe 122U, the vacuum degassing vessel 120 and the downfalling pipe 122L are formed in an arched shape as a whole and pump the molten glass into the vacuum degassing vessel 120 by the principle of siphon, utilizing a differential pressure in the vacuum degassing vessel 120 to remove bubbles contained in the molten glass 121.

Metal conveying-pipes, such as the uprising pipe 122U and the downfalling pipe 122L, are made of platinum, a platinum alloy or the like to avoid reaction with the molten glass 121.

The molten glass 121, which is being supplied by the upstream conveying pipe 130A, is equalized, being stirred by a first stirrer 131a on the way to the uprising pipe. The molten glass 121 thus equalized is pumped into the vacuum degassing vessel 120 through the uprising pipe 122U to be degassed in the vacuum degassing vessel 120. The molten glass 121 thus degassed is guided to the downstream conveying pipe 130B through the downfalling pipe 122L to be conveyed to a forming process, where glass products are produced.

The upstream conveying pipe 130A, the uprising pipe 122U, the vacuum degassing vessel 120, the downfalling pipe 122L and the downstream conveying pipe 130B are metal conveying-pipes. Each of the uprising pipe 122U and the downfalling pipe 122L is fixed at upper and lower end portions thereof or in the vicinity of the upper and lower end portions thereof.

For these reasons, there is a possibility that when the molten glass 121 is conveyed at a high temperature, the uprising pipe 122U or the downfalling pipe 122L is buckled because of being subjected to compressive stress caused in an axial direction by heat.

The first one of the characteristics required for the vacuum degassing vessel 120, the uprising pipe 122U and the downfalling pipe 122L, which are in direct contact with the molten glass 121, is to avoid contamination of glass.

Additionally, equipment, which connects between adjacent regions for melting, refining or forming, to convey the molten glass to a subsequent stage, is also required to have a similar characteristic.

From this viewpoint, specific noble metal having a high melting point has been frequently employed in equipment for dealing with molten glass. In particular, when glass products, which are required to have functionality, are produced, the demand that impurities, which invade from apparatus materials, should be reduced as small as possible, is stronger.

However, the noble metal stated earlier is quite expensive. It is not acceptable to employ such noble metal in a large quantity as in iron or non-iron metal in general. For this reason, the noble metal in glass producing equipment is thinned to be employed as a lining for refractory structures or as a thin-walled cylindrical pipe, which has a complete circular cross-sectional shape that is a shape to be most difficult to be crushed.

The present invention is proposed in consideration of the problems stated earlier. It is an object of the present invention to provide a conduit for molten glass, a connecting conduit for molten glass and a vacuum degassing apparatus, which are capable of coping with expansion and contraction caused by heat, and of producing, at low cost, homogeneous and good quality glass.

With respect to the problems stated earlier, it has been disclosed that a conduit has a convex projection formed therein. For example, JP-A-2002-87826 discloses that a tube has rings formed therein to absorb thermal expansion and that the rings typically have a depth of from 2 to 3 mm. However, such a depth of from about 2 to about 3 mm is insufficient to absorb thermal expansion. The publication describes that the rings are formed by rolling. If an excessively concentrated deformed portion is caused in a ring by rolling, there is a problem that when the conduit with the deformed ring formed therein is energized for heating, electric currents are locally concentrated in a portion of the conduit with the ring formed therein to locally rise the temperature of that portion. It is believed that it is advantageous in terms of removal or separation of bubbles to provide an undulation to a portion of the inner wall of a conduit in a vacuum degassing apparatus so as to have some high degree of pitch difference. However, there is a possibility that the provision of a depth of from about 2 to about 3 mm has a problem because of poor vacuum degassing performance.

JP-A-8-67518 describes that a connecting pipe for connecting between a stirring vessel and a refining vessel or between a stirring vessel and a stirring vessel is formed with a bellows and that the connecting pipe with the bellows formed therein has both ends welded to both stirring vessels or to the stirring vessel and the refining vessel to couple the respective vessels as one unit. However, when being configured in such a coupled structure, there is a problem that it is difficult to control heating by energization since it is difficult to dispose, in a sufficient way, electrode portions for heating by energization.

This publication also describes that the bellows has a spring constant at room temperature set to be smaller than the magnitude of a deforming force per unit length caused at room temperature in the connected vessels in the axial direction of the connecting pipe. However, when the bellows is disposed in an apparatus which is not formed in a completely coupled structure, such as a vacuum degassing apparatus, the spring constant of the bellows at room temperature is not necessarily required to be smaller than the magnitude of a deforming force per unit length caused in the connected vessels in the axial direction of the connecting pipe since creep deformation or buckle is caused at the time of rising the temperature to a high level. When an attempt is made to decrease the spring constant of the bellows, it is necessary to increase the difference in diameter between a small diameter portion and a large diameter portion. This not only causes a problem in terms of cost by an increase in the usage of noble metal but also makes it difficult to secure a sufficient supply of molten glass since the path resistance is increased when the difference in diameter is excessive. Although this publication also describes that the connecting pipe has a thickness of 1 mm and a diameter of from 15 to 25 mm, it is impossible to obtain a sufficient supply of molten glass when the vacuum degassing apparatus has a pipe diameter in such a range. Although this publication also describes that the bellows is formed by, e.g., welding, there is a problem that there is a danger that when a platinum alloy, in particular a dispersion-strengthened platinum alloy, is employed in a conduit, in particular such a movable member, a crack or the like is caused by a decrease in the strength of the welded portions as known.

DISCLOSURE OF INVENTION

In order to attain the object stated earlier, the conduit for molten glass, according to the present invention comprises a metal conduit for flowing molten glass, and the metal conduit having a convex portion continuously formed at 360 degrees in a circumferential direction thereof and at a least one location thereof in an axial direction thereof so as to project outwardly or inwardly, the convex portion having a height of 4 mm or above. By configuring the conduit for molten glass in this way, it is possible to absorb thermal expansion and contraction, and vibration without a change in the entire length of the conduit and to produce good quality glass at low cost.

In a preferred conduit for molten glass, according to the present invention, the height H is 10 mm or above. By configuring the conduit for molten glass in this way, it is possible to easily cope with thermal expansion and contraction.

In another preferred conduit for molten glass, according to the present invention, the height H is 50 mm or below. By configuring the conduit for molten glass in this way, it is possible not only to minimize pressure loss and to effectively cope with thermal expansion and contraction during conveying the molten glass.

A preferred conduit for molten glass, according to the present invention has a wall thickness t of 1.5 mm or below. By setting the wall thickness t at 1.5 mm or below, it is possible to improve the forming accuracy of the conduit for molten glass. When the conduit for molten glass is fabricated from noble metal, such as platinum or a platinum alloy, it is possible to suppress the usage of noble metal to reduce cost.

In the conduit for molten glass, according to a prepared embodiment of the present invention, the metal conduit comprises platinum or a platinum alloy. When the metal conduit comprises a platinum or a platinum alloy, it is possible to avoid reaction with the molten glass to make the molten glass homogeneous and provide the molten glass with good quality during conveying the molten glass for instance.

In the conduit for molten glass, according to another preferred embodiment of the present invention, the metal conduit comprises dispersion-strengthened platinum or a dispersion-strengthened platinum alloy. In the case of the conduit for molten glass, thus configured, grain growth at a high temperature can be suppressed by employing dispersion-strengthened platinum or a dispersion-strengthened platinum alloy with fine ceramic particles dispersed in a matrix of platinum or a matrix of platinum alloy. As a result, it is effective to extend the lifetime when the temperature, at which the conduit for molten glass is used, is beyond 1,300° C. for instance.

The present invention provides the conduit for molten glass, wherein the metal conduit has an opening having a maximum diameter of from 50 to 1,000 mm.

The present invention provides the conduit for molten glass wherein a value (H/t) obtained by dividing the height H by the wall thickness t is from 2.5 to 500.

The present invention provides the conduit for molten glass, wherein the metal conduit has a length of from 200 to 10,000 mm.

The present invention provides the conduit for molten glass, wherein the height H is from 5 to 20% of the maximum diameter of the opening of the metal conduit.

It is preferred that the conduit for molten glass stated earlier be applied when the amount of thermal expansion in the axial direction is 1 mm or above. It is preferred that the conduit for molten glass be applied particularly when the amount of thermal expansion in the axial direction is 1.8 mm or above.

Additionally, the present invention provides a conduit for molten glass comprising a first metal conduit for flowing molten glass, the first metal conduit having a wall formed with an opening; a second metal conduit for flowing the molten glass, the second metal conduit being connected to the opening of the first metal conduit; wherein at least one of the first and second metal conduits comprises the conduit for molten glass stated earlier.

When the connecting conduit thus configured is used for conveying the molten glass, it is possible to cope with thermal expansion and contraction or vibration by welding adjacent conduits for molten glass so as to extend along the same axis as each other.

The present invention provides a vacuum degassing apparatus comprising a vacuum degassing vessel, an uprising pipe for introducing molten glass into the vacuum degassing vessel, and a downfalling pipe for discharging the molten glass from the vacuum degassing vessel, wherein at least one of the vacuum degassing vessel, the uprising pipe and the downfalling pipe comprises the conduit for molten glass stated earlier.

In the vacuum degassing apparatus thus configured, by employing the conduit for molten glass in the vacuum degassing vessel, the uprising pipe, the downfalling pipe or the like, it is possible to cope with thermal expansion and contraction and vibration, which are generated in the conduit for molten glass when conveying the molten glass.

It is preferred that the vacuum degassing apparatus thus configured degas the molten glass, conveying the molten glass, while the ambient pressure in the vacuum degassing vessel is preferably maintained at from 0.01 to 0.5 atm. The pressure is more preferably from 0.05 to 0.08 atm.

The present invention provides a vacuum degassing apparatus comprising a vacuum degassing vessel, an uprising pipe for introducing molten glass into the vacuum degassing vessel, and a downfalling pipe for discharging the molten glass from the vacuum degassing vessel, wherein at least one of a jointed structure of the uprising pipe and the vacuum degassing vessel, and a jointed structure of the vacuum degassing vessel and the downfalling pipe comprises the conduit for molten glass stated earlier.

EXPLANATION OF REFERENCE NUMERALS

Figure 1:
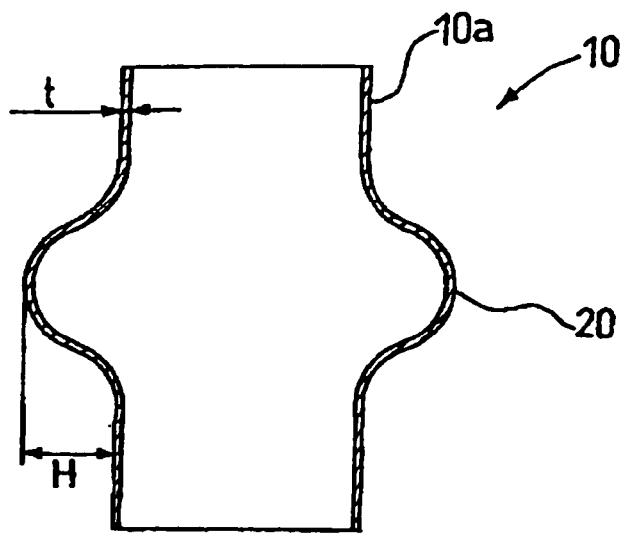
FIG. 1 is a cross-sectional view showing an essential portion of the metal conveying-pipe according to an embodiment of the present invention.

10: Conduit for molten glass
11: Metal conduit
20: Convex portion
30: Vacuum degassing apparatus
31A: Upstream pit
31B: Downstream pit
120: Vacuum degassing vessel
121: Molten glass
122U: Uprising pipe
122L: Downfalling pipe
123: Casing
130A: Upstream conveying pipe
130B: Downstream conveying pipe
H: Height in radial direction
t: Wall thickness

BEST MODE FOR CARRYING OUT THE INVENTION

Figure 12:
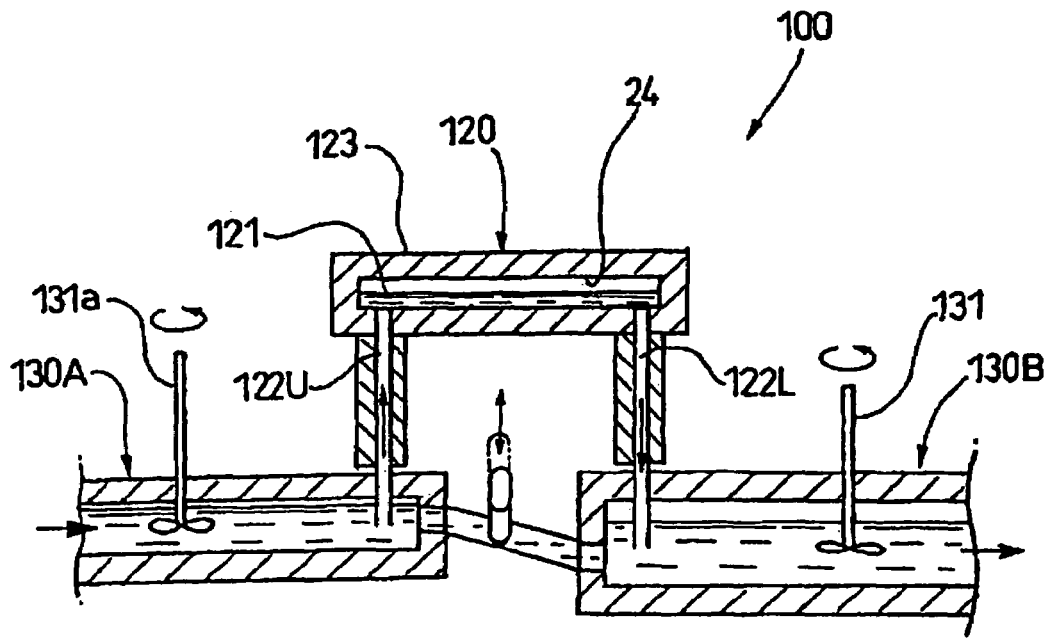
FIG. 12 is a cross-sectional view of a conventional vacuum degassing apparatus.

Now, embodiments of the conduit for molten glass, the connecting conduit for molten glass and the vacuum degassing apparatus according to the present invention will be described in detail based on the accompany drawings. In the following explanation of the embodiments, the members or the like that have been described in reference to FIG. 12 are indicated by the same reference numerals or corresponding reference numerals in figures, and explanation of these members or the like will be simplified or omitted.

Figure 2:
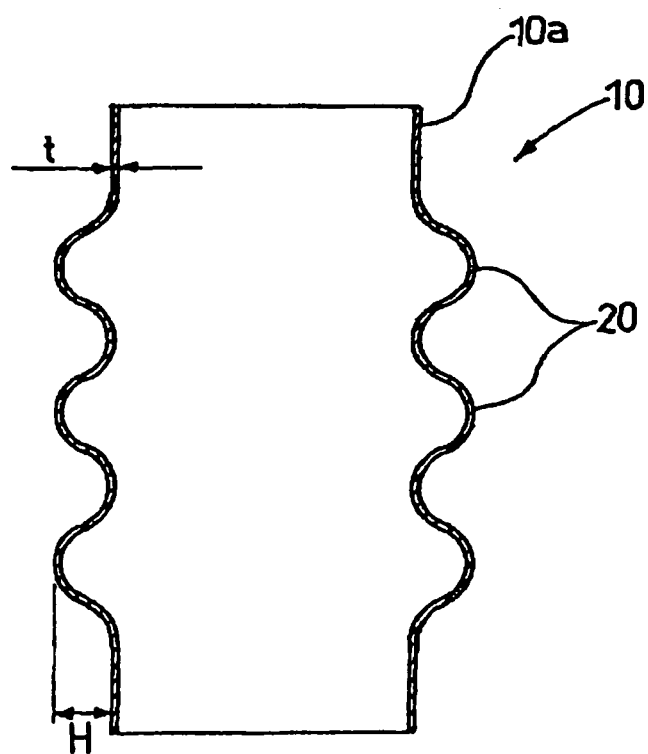
FIG. 2 is a cross-sectional view showing an essential portion of the metal conveying-pipe according to another embodiment of the present invention.
Figure 3:
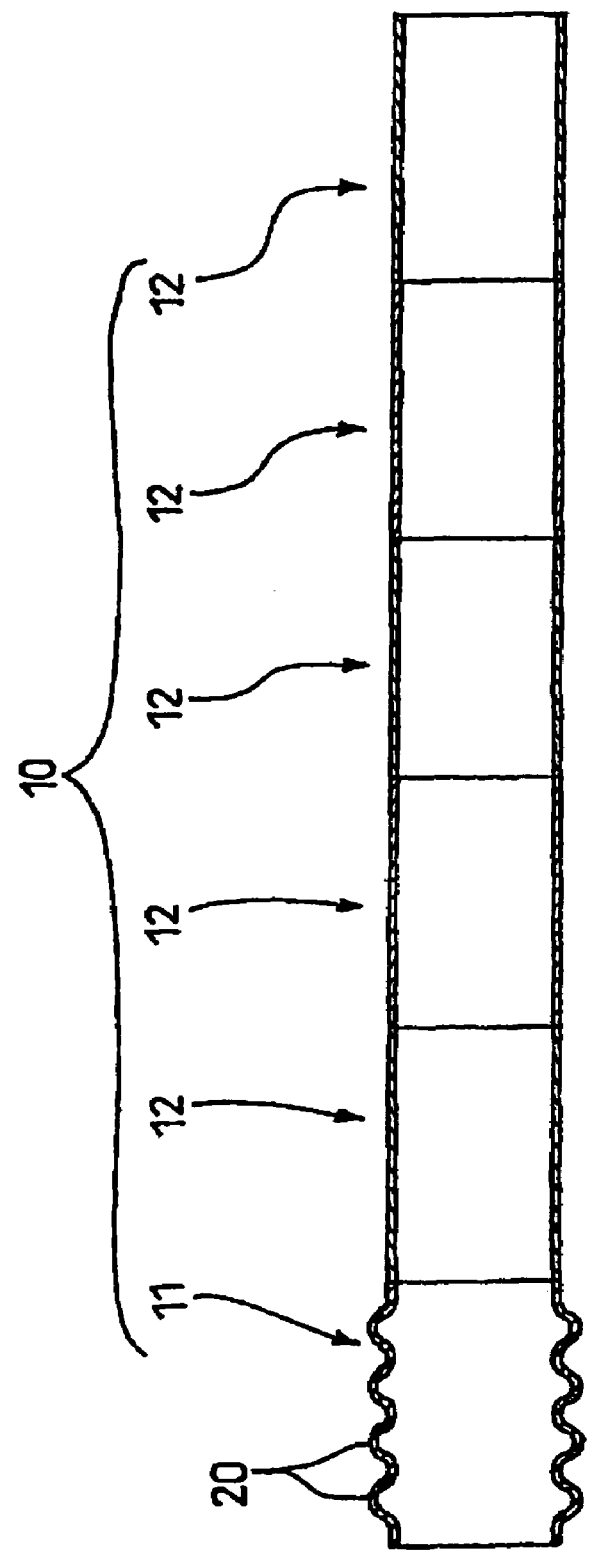
FIG. 3 is a cross-sectional view showing an essential portion of the metal conveying-pipe according to another embodiment of the present invention.

In the conduit for molten glass according to an embodiment of the present invention, the conduit for molten glass 10 has at least one convex portion 20 formed in an outer peripheral surface 10a in an axial direction thereof so as to continuously extend in a circumferential direction as shown in FIG. 1 to FIG. 3.

In other words, the convex portion 20 may be formed at a single location in the conduit for molten glass 10 as shown in FIG. 1 or be formed at two or more locations in the conduit for molten glass as shown in FIG. 2 (at three locations in this embodiment).

Although at least one convex portion 20 may be formed in a portion of a straight pipe as shown in FIG. 1 and FIG. 2, the conduit for molten glass 10 may comprise a conveying pipe (metal conduit) 11 having at least one convex portion 20, and straight pipes 12 having no convex portion 20 as shown in FIG. 3.

It is preferred that the conduit for molten glass 10 have an outer periphery (a cross-sectional outline perpendicular to the pipe axis thereof) formed in a curved shape. Typical examples of the cross-section are a circle and an oval. Another example is a shape similar to a combination of plural convex arcs or to an oval that is formed by successively joining convex arcs and their tangents. This is because it is not preferred that an angular portion be not contained in the outer periphery in cross-section and because it is necessary to avoid, in particular, a case wherein an angular portion having an interior angle of 150° or below is contained.

As shown in FIG. 1 and FIG. 2, the convex portion 20 has a height H of 4 mm or above, preferably 50 mm or below, more preferably from 10 to 20 mm in a radial direction. The height H in the radial direction designates the height of the convex portion 20 in the radial direction of the conduit for molten glass 10, and the height H in the present invention means this height all the time. When the convex portion 20 has a height H of less than 4 mm, the conduit for molten glass fails to cope with thermal expansion in a sufficient manner. In particular, in the case of employing the conduit for molten glass as the conveying pipe of the vacuum degassing apparatus, when the height of the convex portion is small, there is a tendency that the capability of removing bubbles is deteriorated. When the height of the convex portion is too large, there is a possibility that the pressure loss in the vacuum degassing pipe is great to prevent a sufficient flow rate of glass from being obtained.

The height H of the convex portion 20 is preferably from 5 to 20% of, more preferably from 5 to 10% of the maximum diameter of the open portion of the conduit for molten glass 10. The maximum diameter of the open portion means the maximum diameter of the cross-sectional shape in a plane perpendicular to the axial direction of the conduit for molten glass 10. For example, when the cross-sectional shape is a circle, the maximum diameter of the open portion is the diameter of the circle. When the cross-sectional shape is an oval, the maximum diameter of the open portion is the major axis of the oval. When the convex portion 20 has a height H in these ranges, it is possible to improve the capability of removing bubbles without increasing the pressure loss during conveying molten glass. When the maximum diameter of the open portion is small, the section modulus decreases to make the conduit deformable. When the maximum diameter of the open portion is too large, it is not practical in terms of cost since it is necessary to provide the pipe with backup reinforcement or the like. Accordingly, the maximum diameter preferably ranges from 50 to 1,000 mm and more preferably ranges from 50 to 300 mm.

From the viewpoint of the strength required for the conduit for molten glass 10, the height H (mm) of the convex portion 20 is preferably set so that the value (H/t) obtained by dividing H by the wall thickness t (mm) of the conduit for molten glass 10 ranges from 2.5 to 500. The value (H/t) more preferably ranges from 8 to 70.

The conduit for molten glass 10 has a length preferably ranging from 100 to 10,000 mm, more preferably ranging from 200 to 10,000 mm in consideration of the pressure loss in the pipe route.

The conduit for molten glass 10 can effectively cope with thermal expansion and contraction by adjusting the height H of the convex portion 20 or the maximum diameter of the open portion as stated earlier. In particular, when the conduit for molten glass 10 is employed in a vacuum degassing apparatus, the conduit for molten glass 10 is required to be capable of flexibly coping with thermal expansion, thermal contraction and vibration since it is necessary to fabricate the conduit so to have a quite complicated route. In this regard, the conduit for molten glass, according to the present invention is effective because of being capable of more flexibly coping with thermal expansion and contraction or vibration.

When the conduit for molten glass is subjected to such adjustment and is employed in particular in a vacuum degassing apparatus, the conduit for molten glass has an advantage of being capable of more effectively removing bubbles. As stated earlier, bubbles in molten glass are removed by a differential pressure in the vacuum degassing apparatus. The mechanism of bubble removal is supposed to be that bubbles disappear since, by a differential pressure before and after pumping the molten glass through the uprising pipe, the diameter of bubbles is gradually increased and the bubbles are broken on the surface of the molten glass in the vacuum degassing vessel. Although the details are not clear, it is supposed that it is possible to create moderate turbulence in the flow of glass in the pipe to more effectively remove bubbles by disposing the convex portion at an intermediate location of the conduit for molten glass.

Figure 4:
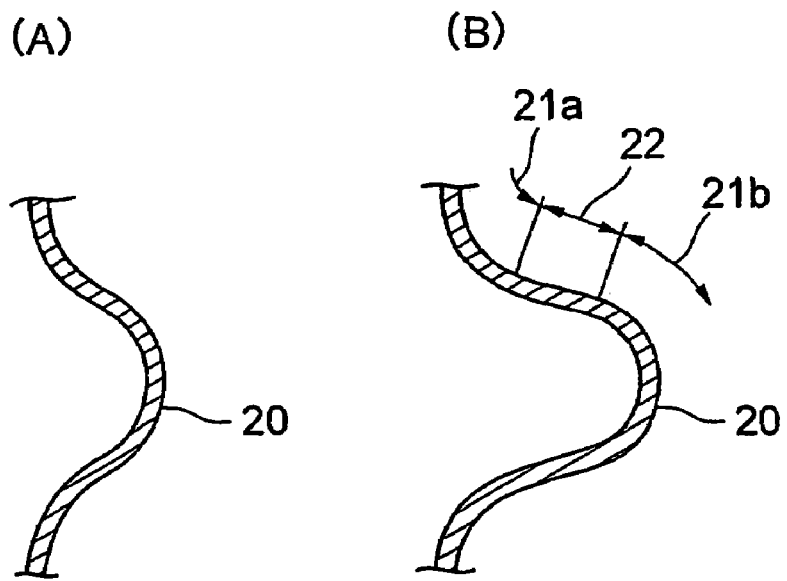
FIGS. 4(A) and (B) are a partial cross-sectional view of a convex portion comprising only a curved portion, and a partial cross-sectional view of a convex portion comprising a combination of a curved portion and a linear portion in an axial direction, respectively.

Although the convex portion 20 is formed in a shape comprising only arc curves in a cross-sectional shape in the axial direction of the conduit for molten glass as shown in FIG. 4(A), the convex portion may have a linear portion 22 between a curved portion 21*a* and another curved portion 21*b* as shown in FIG. 4(B).

Figure 5:
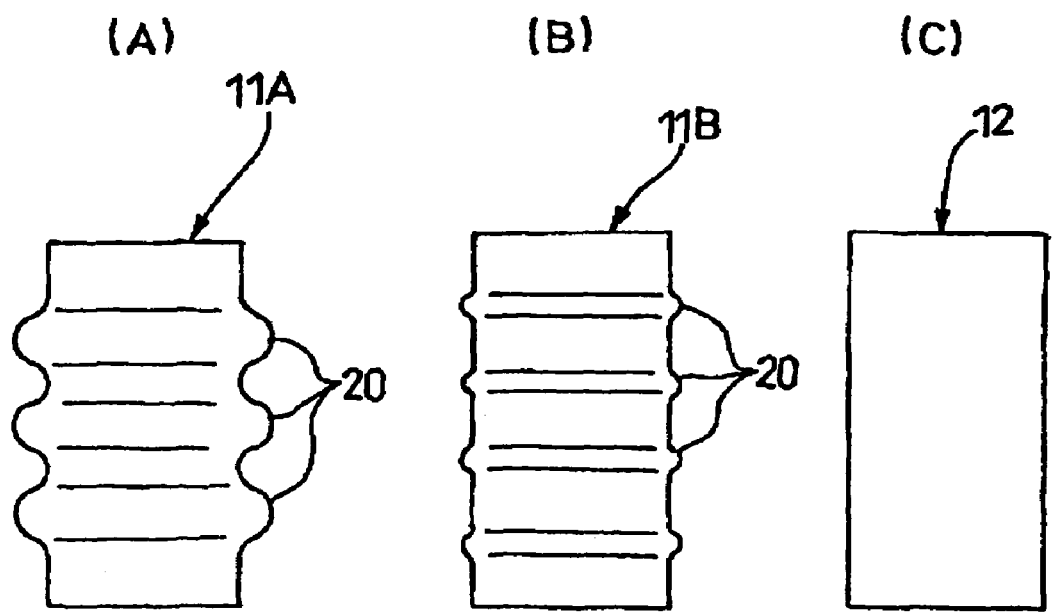
FIGS. 5(A), (B) and (C) are cross-sectional views in an axial direction in a case wherein large convex portions are successfully disposed, a case wherein small convex portions are disposed at certain pitches, and a case of using a straight pipe.

With respect to how to dispose the convex portion 20, the convex portion 20 may be disposed at plural successive locations as in the conveying pipe 11A shown in FIG. 5(A), or the convex portion may be disposed at equal pitches as in the conveying pipe 11B shown in FIG. 5(B). FIG. 5(C) show a straight pipe 12 having no convex portion 20.

Figure 6:
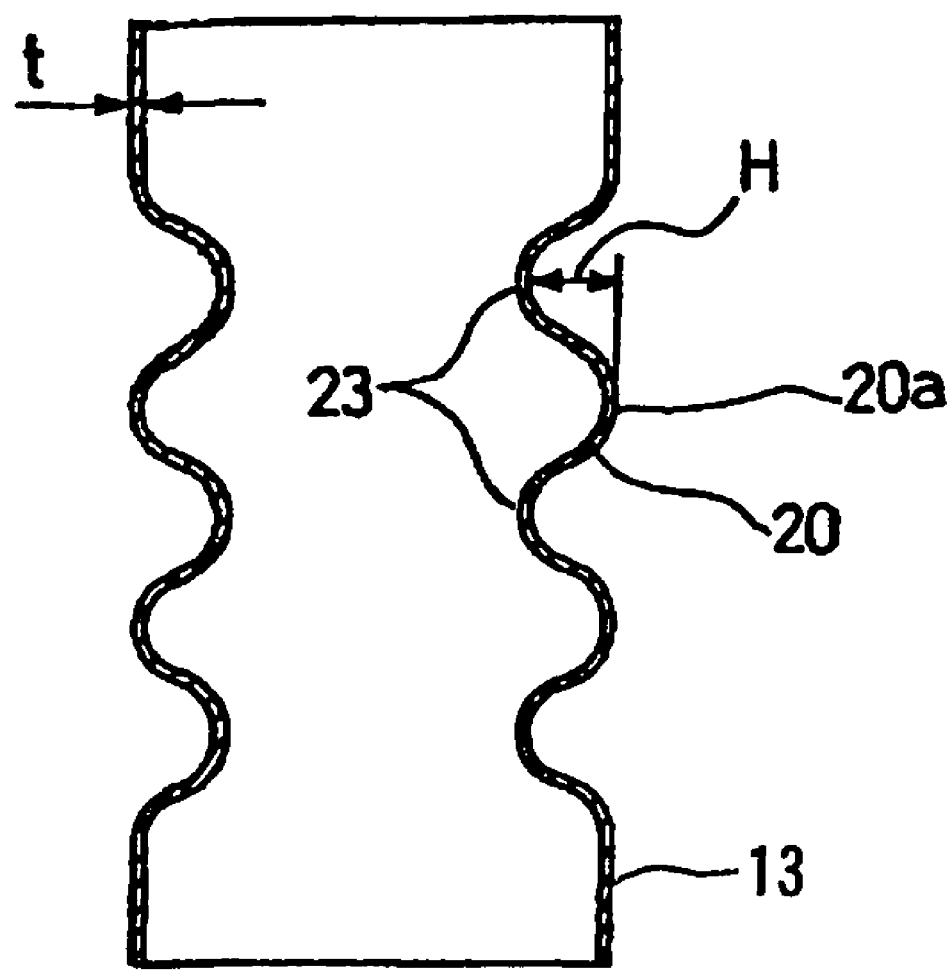
FIG. 6 is a cross-sectional view in an axial direction, showing a case wherein convex portions are disposed so as to project toward the center of the pipe.

The convex portion 20 may be configured to have a leading edge 20*a* formed to have the same outer diameter as a straight pipe portion 13 of the conduit for molten glass 10 as shown in FIG. 6. In this case, the conduit for molten glass is configured in substantially the same shape as a case wherein a concave portion 23 is disposed in a straight pipe 12 (see FIG. 5(C)). In other words, the convex portion 20 according to the present invention, may be disposed toward an inward or outward direction of the conduit for molten glass 10. When the convex portion 20 is disposed toward an inward direction of the conduit for molten glass 10, the height H of the convex portion 20 may be regarded as being the depth of the concave portion 23.

By configuring the conduit for molten glass 10 as stated earlier, the convex portion 20 can be crushed in the axial direction to absorb thermal expansion or be expanded in the axial direction to compensate an amount of thermal expansion or thermal contraction when the thermal expansion or contraction is generated in the conduit for molten glass 10 by, e.g. heating-up. Thus, the conduit for molten glass 10 can cope with expansion and contraction without having a change in the entire length thereof.

The present invention also provides a connecting conduit for molten glass, which comprises a first metal conduit configured to flow molten glass and having a wall formed with an opening, and a second metal conduit connected to the opening in order to flow the molten glass, at least one of the first metal conduit and the second metal conduit comprising the conduit for molten glass, stated earlier.

Figure 7:
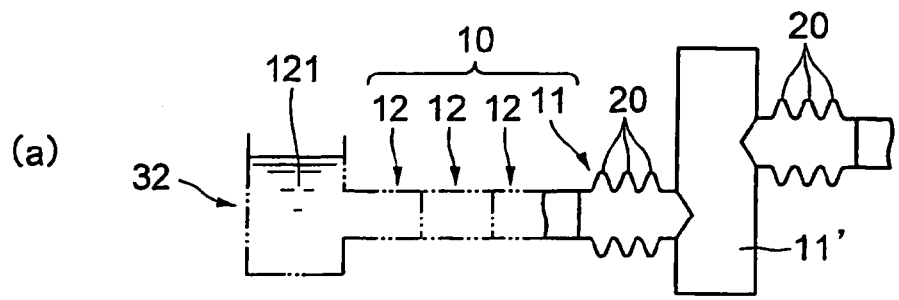
FIGS. 7(A) and (B) are a schematic view showing how concave portions absorb expansion and contraction in the axial direction of connecting conduits, and a schematic view showing how to absorb vibration in a direction perpendicular to the axis, respectively.
Figure 7:
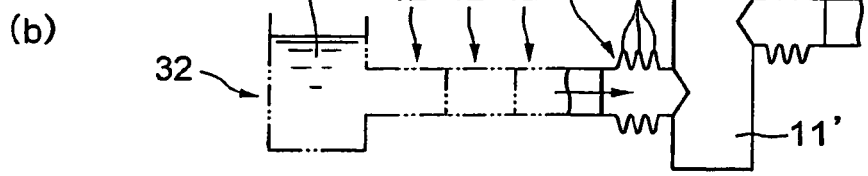
Figure 7:
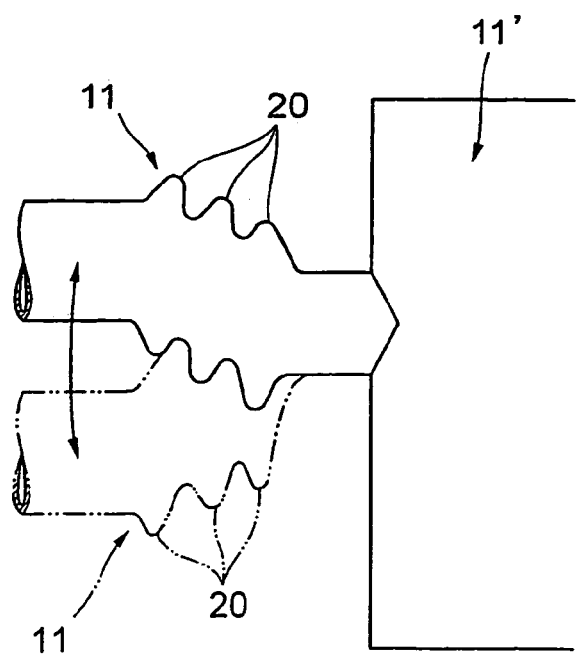

The connecting conduit will be described in reference to FIGS. 7(A) and (B). In FIG. 7(A)(a), the second metal conduit 11 is connected, by e.g., welding, to the opening formed in the wall of the first metal conduit 11' extending vertically. The second metal conduit 11 having the convex portions 20 formed therein, and the entire structure of the metal conduit 11 is substantially the same as the conduit for molten glass stated earlier. The connecting conduit is available as a jointed structure of the first metal conduit 11' and the second metal conduit 11. In this embodiment, the second metal conduit 11 may be configured as an extended conduit for molten glass 10 by being coupled with straight pipes 12 without the convex portion 20 disposed therein. The extended conduit for molten glass 10 serves to connect between a pit 32 and the first metal conduit 11', and the molten glass 121 stored in the pit 32 flows into the connecting conduit through the conduit for molten glass 10. FIG. 7(B) shows a connected portion in FIG. 7(A)(a) in detail.

Even if the conduit for molten glass 10 is expanded in the axial direction by heat at the time of heating-up, the convex portions 20 can absorb the amount of expansion by such arrangement (see FIG. 7(A)(b)). Accordingly, the entire length of the conduit for molten glass 10 is prevented from being changed, and the positions of the pit 32 and the first metal conduit 11' can be kept with high precision without the pit and the first metal conduit being pressed against the conduit for molten glass 10. Even if the temperature is changed or a pipe is vibrated for some reason during conveying the molten glass, the positions of the pit 32 and the first metal conduit 11' can be prevented from being changed.

Specifically, with respect to vibration in the axial direction of the second metal conduit 11, the convex portions 20 can be crushed or expanded in the axial direction to absorb the vibration as shown in FIG. 7(A). FIG. 7(A)(b) shows a state wherein the metal conduit 11 shown in FIG. 7(A)(a) has a force or vibration applied thereto in the direction indicated by an arrow, whereby the convex portions 20 are properly deformed. With respect to vibration in a direction perpendicular to the axial direction of the second metal conduit 11, the vibration can be absorbed as shown in FIG. 7(B). Thus, it is possible to prevent vibration from being transmitted to another adjacent conduit for molten glass, not shown. Although the convex portions 20 are not disposed in the first metal conduit 11' in this embodiment, a convex portion 20 may be also disposed in the metal conduit 11' as required.

The conduit for molten glass 10 has a wall thickness t set at preferably 1.5 mm or below, more preferably 1.2 mm or below. The wall thickness t has a lower limit of preferably 0.1 mm or above, more preferably 0.3 mm or above.

It is preferred in terms of durability that the conduit for molten glass 10 be made of platinum or a platinum alloy. The conduit for molten glass 10 may comprise a dispersion-strengthened platinum alloy with fine ceramic particles dispersed in a matrix of platinum or a matrix of platinum alloy, specifically dispersion-strengthened platinum or a dispersion-strengthened platinum alloy. Typical examples of the dispersed ceramic particles dispersed in dispersion-strengthened platinum or a dispersion-strengthened platinum alloy are particles of zirconium oxide, of yttrium oxide and of a combination of these materials.

By employing platinum or a platinum alloy in the conduit for molten glass 10, it is possible to avoid the reaction between molten glass and the conduit for molten glass during conveying the molten glass for instance. Thus, it is possible to make the molten glass homogeneous and to provide the molten glass with a better quality. Additionally, it is possible to reduce cost by setting the wall thickness t at 1.5 mm or below to suppress the usage of metal, such as platinum or a platinum alloy. It is also possible to suppress grain growth at a high temperature by employing disperse-strengthened platinum or a disperse-strengthened platinum alloy with fine ceramic particles dispersed in a matrix of platinum or a matrix of platinum alloy. Thus, it is possible to extend the lifetime of the conduit for molten glass 10 when the conduit for molten glass 10 is employed at a temperature beyond, e.g., 1,300° C.

When the conduit for molten glass 10 is employed to convey the molten glass 121, the conduit for molten glass may be employed, being welded to another conduit for molten glass 10 so as to have axial directions of both conduits forming a right angle, an obtuse angle or an acute angle as required.

Figure 8:
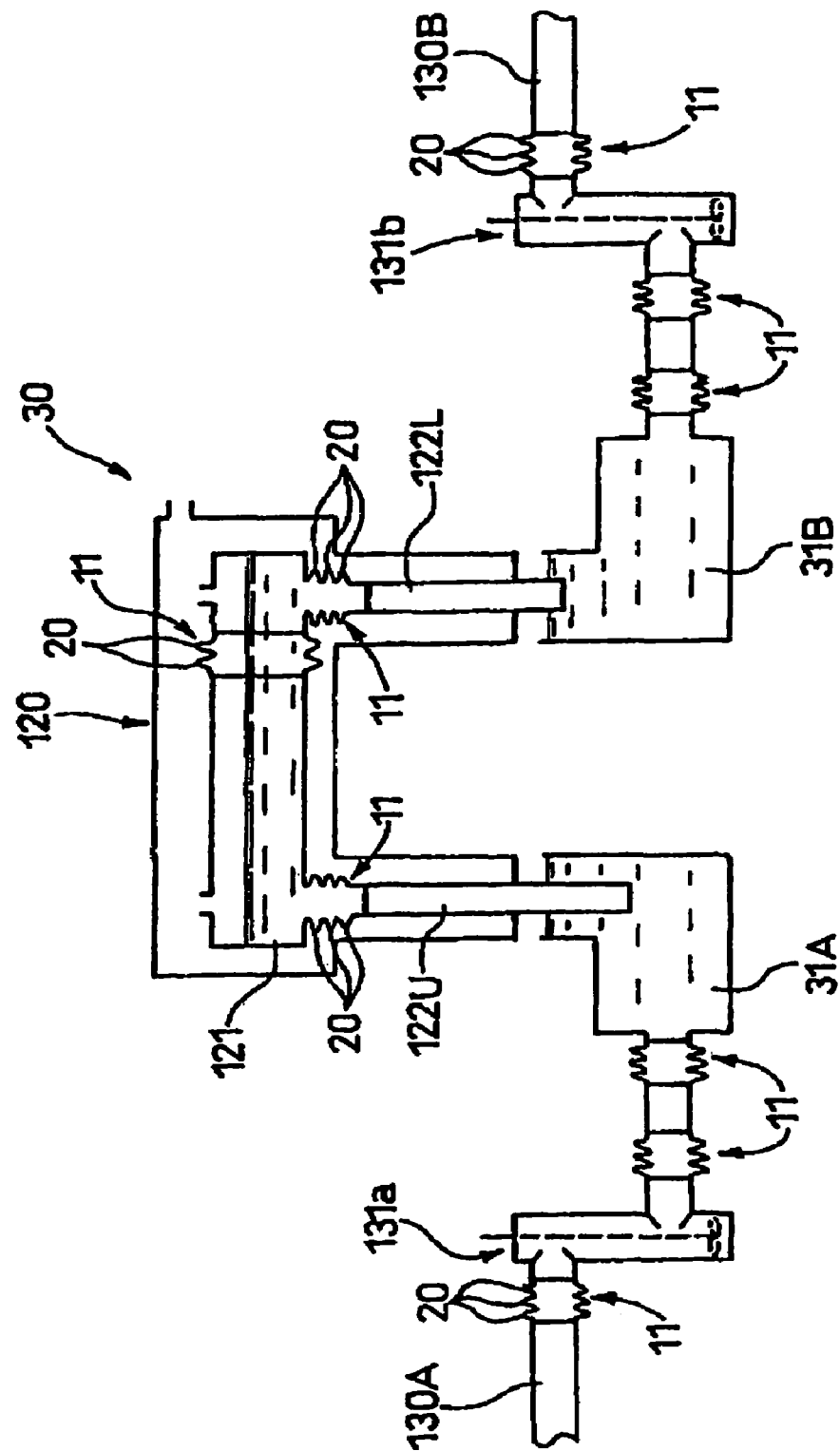
FIG. 8 is a schematic view showing the entire structure of a vacuum degassing apparatus according to the present invention.

Next, the vacuum degassing apparatus according to an embodiment of the present invention will be described. FIG. 8 shows the entire structure of the vacuum degassing apparatus 30.

Parts common to the parts stated earlier with respect to FIG. 1 to FIGS. 7(A) and (B) and FIG. 12 are indicated by the same reference numerals, and overlapping explanation will be omitted.

The vacuum degassing apparatus 30 includes an upstream conveying pipe 130A for supplying molten glass 121 to an upstream pit 31A, an uprising pipe 122U for drawing up the molten glass 121 in a vertically upward direction, a vacuum degassing vessel 120 disposed to extend horizontally from an upper end of the uprising pipe 122U, a downfalling pipe 122L for vertically lowering the molten glass 121 from a downstream end portion of the vacuum degassing vessel 120 to guide the molten glass to a downstream pit 31B, and a downstream conveying pipe 130B for guiding the molten glass 121 from the downstream pit 31B in a further downstream side. Each of these parts may comprise the conduit for molten glass (metal conduit) 10 stated earlier, as required.

Specifically, at least one convex portion is disposed in each of the uprising pipe 122U and the downfalling pipe 122L in the axial direction thereof. By disposing the convex portion 20, thermal expansion or contraction and vibration, which are caused in the uprising pipe 122U and the downfalling pipe 122L during conveying the molten glass 121 having a high temperature, can be absorbed to absorb stresses caused in the uprising pipe 122U and the downfalling pipe 122L, stably maintaining the entire arched shape of the vacuum degassing apparatus 30. The vacuum degassing vessel 120 also has the convex portion 20 disposed therein in order to cope with thermal expansion or contraction and vibration.

Each of the upstream conveying pipe 130A and the downstream conveying pipe 130B may comprise the conduit for molten glass 10 stated earlier. It is preferred from the viewing of withstanding vibration caused in the vacuum degassing apparatus that the connecting conduit stated earlier be employed in a jointed structure of the uprising pipe 122U and the vacuum degassing vessel 120 and a jointed structure of the vacuum degassing vessel 120 and the downfalling pipe 122L. In particular, in the case of a vacuum degassing apparatus, the uprising pipe 122U, the vacuum degassing vessel 120 and the downfalling pipe 122L have an extremely large length in many cases. In such cases, the connecting conduit according to the present invention is preferred because of capable of coping with thermal expansion or contraction and vibration.

Figure 9:
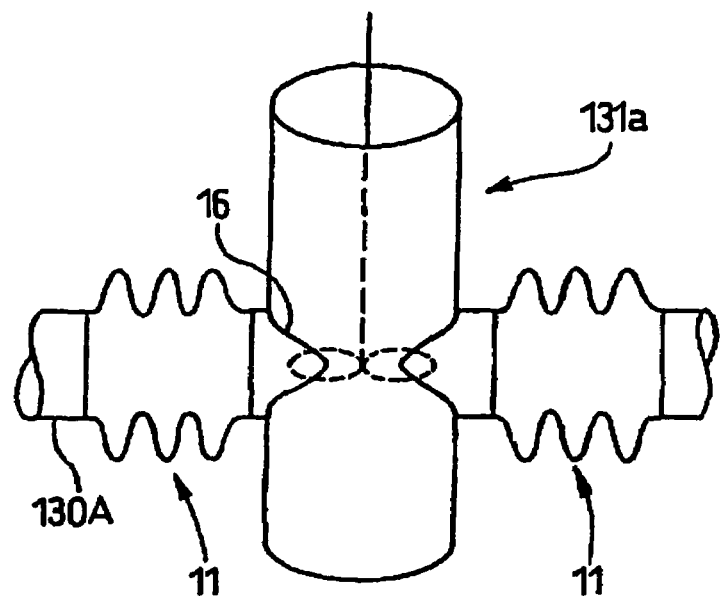
FIG. 9 is a schematic view showing welded portions for connection with conveying pipes.

As shown in FIG. 8 and FIG. 9, the upstream pit 31A and the downstream pit 31B have a first stirrer 131a and a second stirrer 131b as stirring devices disposed therein, and the first stirrer 131a and the second stirrer 131b are jointed to the upstream conveying pipe 130A and the downstream conveying pipe 130B by respective welding portions 16, respectively.

It is preferred from the viewpoint of coping with vibration caused by the stirrers that the conduit for molten glass 10 stated earlier, e.g., the metal conduit 11 stated earlier be employed in the vicinity of each of the jointed portions.

EXAMPLE

Now, specific examples will be explained. Samples similar to three kinds of the conveying pipe 11A, the conveying pipe 11B and the straight pipe 12 shown in FIGS. 5(A) to (C) were prepared by using an alloy of platinum with 10% rhodium contained therein. (Sample A was an example, and Samples B and C were comparative examples.)

Sample A was a pipe similar to the conveying pipe 11A shown in FIG. 5(A) and comprised a cylinder having a wall thickness of 0.8 mm, an outer diameter (size) of 102 mm, and a length of 145 mm, and three convex portions 30 successively disposed in the cylinder, each of the convex portions having an outer diameter of 128 mm and a width of 30 mm. Accordingly, each of the convex portions 20 had a height of 13 mm.

Sample B was a pipe similar to the conveying pipe 11B shown in FIG. 5(B) and comprised a cylinder having a wall thickness of 0.8 mm, an outer diameter of 102 mm and a length of 145 mm, and four convex portions 20 disposed at pitches of 30 mm in the cylinder, each of the convex portions having a height of 3 mm and a width of 7 mm.

Sample C was a pipe similar to the straight pipe 12 shown in FIG. 5(C) and had a wall thickness of 0.8 mm, an outer diameter of 102 mm and a length of 145 mm.

Figure 10:
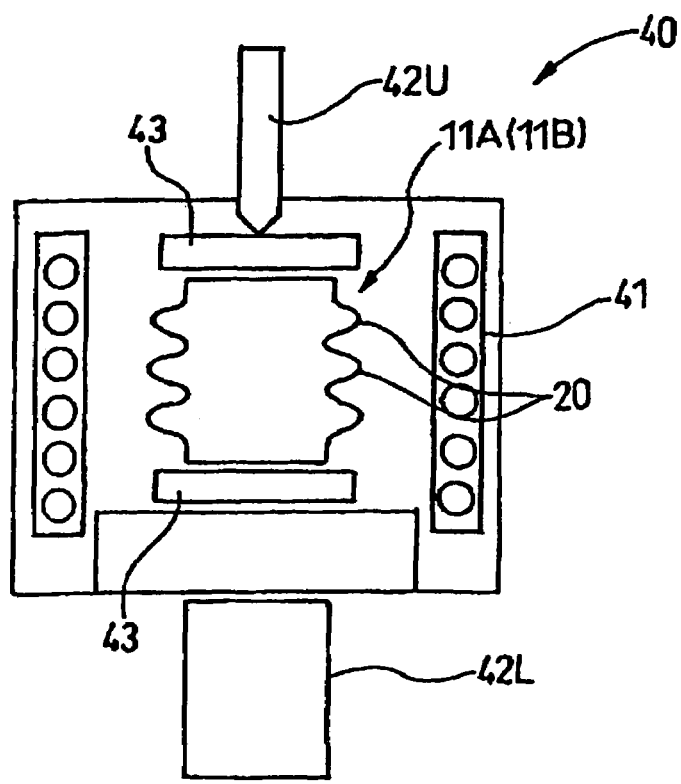
FIG. 10 is a cross-sectional view showing a measuring system for thermal stress.

A system 40 shown in FIG. 10 was employed to measure thermal stresses with respect to each of Samples A to C. Specifically, each of Samples A to C or the like was heated at a temperature rising rate of 200° C./h in an electric furnace 41. In order that each of the samples was resistant to thermal expansion and was prevented from being expanded vertically, each of the samples was held by fixing members 42U and 42L. Measurement was performed, a compressive force applied to a fixing member 42U (or 42L) being regarded as a thermal stress. Measurement results are shown in FIG. 11.

In order that Samples A to C were prevented from being deformed, each of Samples A to C had both upper and lower ends capped and engaged with fixing jigs 43 which was formed in a deep dish shape corresponding to the diameter of the pipes (see FIG. 10).

Figure 11:
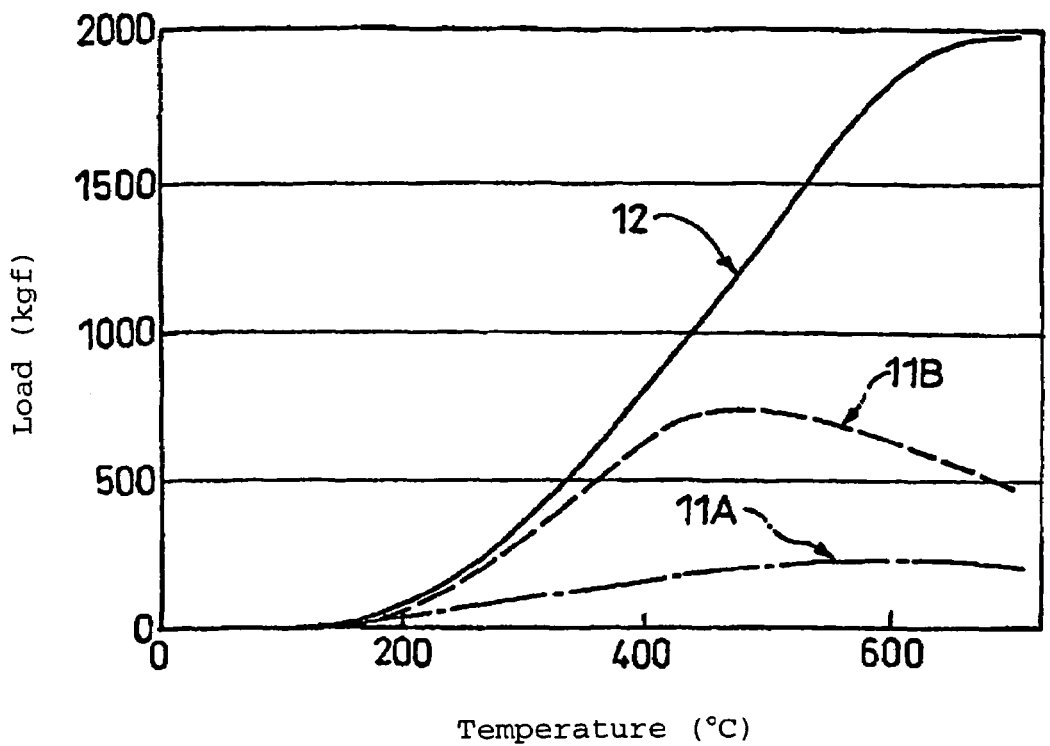
FIG. 11 is a graph showing measurement results of thermal stress.

As shown in the graph of FIG. 11, it is seen that the thermal stress generated in Sample A was smallest and that the convex portions 20 of Sample A absorbed expansion and contraction in the most effective way.

Sample B had a larger stress than Sample A since each of the convex portions 20 had a height of less than 4 mm. In particular, when Sample B is employed in a vacuum degassing apparatus, Sample B is not sufficient in terms of durability since absorption of a thermal stress is small. Sample C was also insufficient in terms of durability since a thermal stress was further large because of the absence of the convex portion 20 for absorbing a thermal stress.

As explained, it is clear that the convex portion 20 is effective to absorb thermal expansion or contraction.

The conduit for molten glass and the vacuum degassing apparatus according to the present invention are not limited to the embodiments stated earlier. Appropriate modification and variation of the present invention may be made.

INDUSTRIAL APPLICABILITY

As explained, in accordance with the conduit for molten glass, according to the present invention, the convex portion is disposed at at least one location thereof in an axial direction thereof so to project outwardly or inwardly at 360 degrees in the circumferential direction thereof. Accordingly, it is possible to absorb thermal expansion or contraction without the entire length of the conduit being changed and to produce quality glass at low cost.

The entire disclosure of Japanese Patent Application No. 2003-027171 filed on Feb. 4, 2003 including specification, claims, drawings and summary is incorporated herein by reference in its entirety.

What is claimed is:

1. A conduit for molten glass, comprising a metal conduit for flowing molten glass, and the metal conduit having a convex portion continuously formed at 360 degrees in a circumferential direction thereof and at a least one location thereof in an axial direction thereof so as to project outwardly or inwardly for absorbing and expanding exclusively by heat generated by the molten glass, the convex portion having a height of 4 mm or above and said conduit being heated exclusively by heat generated via the molten glass, said convex portion absorbing thermal expansion and contraction without changing a length dimension of said metal conduit.

2. The conduit for molten glass according to claim 1, wherein the height H is 10 mm or above.

3. The conduit for molten glass according to claim 1, wherein the height H is 50 mm or below.

4. The conduit for molten glass according to claim 1, wherein the pipe has a wall thickness t of 1.5 mm or below.

5. The conduit for molten glass according to claim 1, wherein the metal conduit comprises platinum or a platinum alloy.

6. The conduit for molten glass according to claim 1, wherein the metal conduit comprises dispersion-strengthened platinum or a dispersion-strengthened platinum alloy.

7. The conduit for molten glass according to claim 1, wherein the pipe has an open portion having a maximum diameter of from 50 to 1,000 mm.

8. The conduit for molten glass according to claim 4, wherein a value (H/t) obtained by dividing the height H by the wall thickness t is from 2.5 to 500.

9. The conduit for molten glass according to claim 1, wherein the pipe has a length of from 100 to 10,000 mm.

10. The conduit for molten glass according to claim 1, wherein the height H is from 5 to 20% of the maximum diameter of the open portion of the pipe.

11. A conduit for molten glass, comprising a first metal conduit for flowing molten glass, the first metal conduit having a wall formed with an opening; a second metal conduit for flowing the molten glass, the second metal conduit being connected to the opening of the first metal conduit; wherein at least one of the first and second metal conduits comprises the conduit for molten glass, defined in claim 1.

12. A vacuum degassing apparatus comprising a vacuum degassing vessel, an uprising pipe for introducing molten glass into the vacuum degassing vessel, and a downfalling pipe for discharging the molten glass from the vacuum degassing vessel, wherein at least one of the vacuum degassing vessel, the uprising pipe and the downfalling pipe comprises the conduit for molten glass, defined in claim 1.

13. A vacuum degassing apparatus comprising a vacuum degassing vessel, an uprising pipe for introducing molten glass into the vacuum degassing vessel, and a downfalling pipe for discharging the molten glass from the vacuum degassing vessel, wherein at least one of a jointed structure of the uprising pipe and the vacuum degassing vessel, and a jointed structure of the vacuum degassing vessel and the downfalling pipe comprises the conduit for molten glass, defined in claim 11.

* * * * *